US006952450B2

United States Patent
Cohen

(10) Patent No.: US 6,952,450 B2
(45) Date of Patent: Oct. 4, 2005

(54) UNEQUAL ERROR PROTECTION OF VIDEO BASED ON MOTION VECTOR CHARACTERISTICS

(75) Inventor: Robert Cohen, Troy, NY (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 505 days.

(21) Appl. No.: 10/077,059

(22) Filed: Feb. 15, 2002

(65) Prior Publication Data

US 2003/0156645 A1 Aug. 21, 2003

(51) Int. Cl.⁷ .............................................. H04N 7/18
(52) U.S. Cl. ........................ 375/240.16; 375/240.17; 375/240.25; 375/240.27
(58) Field of Search ...................... 375/240.25–240.29

(56) References Cited

U.S. PATENT DOCUMENTS

| | | | | |
|---|---|---|---|---|
| 5,291,286 A | * | 3/1994 | Murakami et al. | 348/469 |
| 6,141,448 A | * | 10/2000 | Khansari et al. | 382/236 |
| 6,148,028 A | * | 11/2000 | Kikuchi et al. | 375/240 |
| 6,192,077 B1 | * | 2/2001 | Sugiyama | 375/240.12 |
| 6,519,004 B1 | * | 2/2003 | Bahl | 348/385.1 |
| 6,674,911 B1 | * | 1/2004 | Pearlman et al. | 382/240 |
| 6,754,277 B1 | * | 6/2004 | Heinzelman et al. | 375/240.27 |

FOREIGN PATENT DOCUMENTS

| | | | | |
|---|---|---|---|---|
| EP | 0969614 A2 | 1/2000 | ............ | H04H/1/00 |
| EP | 1018815 A2 | 7/2000 | ............ | H04L/1/00 |

OTHER PUBLICATIONS

By Wendi R. Heinzelman et al. Entitled: "Unequal Error Protection of MPEG–4 Compressed Video" Int. Conf. on Image Proc. Kobe Japan, 1999, vol. 2, pp. 530–534.

By Seong Hwan Jang et al. Entitled: "Object–Oriented Source and Channel Coding for Video Messaging Application Over Wireless Networks"; GLOBECOM 2000 vol. 3. pp. 1339–1343.

By by M. Bystrom et al. Entitled: "Soft Decoding for Robust Video Transmission"; 2001 IEEE Wireless Comm. and Networking Conference. vol. 1, pp. 196–201.

By Jianfei Cai et al. Entitled: "An FEC–Based Error Control Scheme for Wireless MPEG–4 Video Transmission" 2000 IEEE Wireless Comm. and Networking Conference vol. 3, pp. 1243–1247.

MPEG Video Compression Technique http://rnvs.informatik.tu-chemnitz.de/–jan/MPEG/HTML/mepg_tech.html, pp. 1–10.

By Chad Fogg, Entitled: "MPEG–2FAQ" http://bmrc.berkeley.edu/research/mpeg/faq/mpeg2–v38.faq_v38.html pp. 1–13.

By K. Illgner et al. Entitled: "Hierarchical Coding of Motion Vector Fields" IEEE Comp. Soc. Press, US, vol. 3, Oct. 23, 1995, pp. 566–569.

* cited by examiner

*Primary Examiner*—Andy Rao

(57) ABSTRACT

In a first embodiment according to the present invention, a method for data transmission is provided. A multimedia stream is received through an electronic medium. Within the stream are a plurality of vectors. Based on the vectors, a plurality of error protection units are added to the multimedia stream.

27 Claims, 3 Drawing Sheets

Motion Vector-Based Unequal Error Protection.

Figure 1. Motion Vector-Based Unequal Error Protection.

UNEQUAL ERROR PROTECTION OF VIDEO BASED ON MOTION VECTOR CHARACTERISTICS

BACKGROUND

Computers can be organized into a network, for example, a client-server network or a peer-to-peer network. In both types of networks, the computers exchange data with one-another over physical and/or wireless connections. Data transmitted over a physical connection (e.g., by interconnecting copper wires or fiber optic cables) has a lower error rate than data transmitted over a wireless connection (e.g., by radio or infrared waves). For example, physical connections generally have BERs (bit error rates) of less than $10^{-3}$, while wireless connections have much harsher conditions on the order of $10^{-1}$ to $10^{-3}$ BERs Multimedia is one of the types of data that can be transmitted over a network. Multimedia refers to text, graphics, voice, or video. In order to use bandwidth more efficiently, multimedia is compressed into a bitstream when transmitted over a network. Generally, video (which is a type of multimedia) uses compression algorithms with predictive coding of frames and variable length codewords. This is used to obtain high degrees of compression. However, the compressed video bitstream also becomes more sensitive to errors in transmission, as predictive coding causes errors in the reconstruction of video to propagate in time to future frames of video. Also, the use of variable-length code words can cause the decoder to lose synchronization with the encoder in the presence of bit errors. To make the bitstream more robust for transmission over networks, error protection is added to different parts of the video stream.

One way of transmitting video is with MPEG (Moving Pictures Experts Group). The MPEG format compresses video into a bitstream, which is composed of video packets, by predicting motion from frame to frame in the temporal direction, and then using DCTs (Discrete Cosine Transform) to organize any redundances in the spatial directions. The video packets begin with a header, which is followed by motion information, texture information, and stuffing bits. MPEG partitions video into I, P or B frames (Intra, Predicted, or Bidirectional frames). The I-frames are intra coded: they can be reconstructed without any reference to other frames. The P-frames are forward predicted from the last I-frame or P-frame. The B-frames are both, forward predicted and backward predicted from the last/next I-frame or P-frame. An object present in an I frame is predicted in a P or B frame by a motion vector. In MPEG, motion vectors have a horizontal and vertical component, which show the magnitude and direction of motion for the object from the I frame to the P or B frame.

To make the compressed video stream more robust to errors that arise during transmission, several error correction tools to enable detection, containment, and concealment of errors are used. Such tools include resynchronization makers, header extension codes, data partitioning, and variable length coding. MPEG based video can be protected during transmission by partitioning the video into portions of varying importance, such as headers, motion vectors, and DCT values. Error correcting codes, such as Reed-Solomon Erasure codes or feedback-based protection schemes (e.g., Type I or II hybrid ARQ) can also be added to the video portions to improve robustness. However, since the strength of the error protection is based solely on the data partition type, these error protection methods ignore the data actually contained in the data streams. This results in increased overhead for coding non-important portions of the video streams.

SUMMARY OF THE INVENTION

In a first embodiment according to the present invention, a method for data transmission is provided. A multimedia stream is received through an electronic medium. Within the stream are a plurality of vectors. Based on the vectors, a plurality of error protection units are added to the multimedia stream.

In a second embodiment according to the present invention, a method for data transmission is provided. A video stream is received through an electronic medium. The stream comprises a plurality of vectors. An importance is assigned to the vectors. Based on the importance, a plurality of error protection units are added to the video stream. Also, based on the importance, the video stream is partitioned.

In a third embodiment according to the present invention, a method for data transmission is provided. A video transmission is generated. The video transmission is converted to a video stream, and the video stream comprises a plurality of vectors. An importance is assigned to each of the vectors. Based on the importance, a plurality of error protection units is assigned to the video stream. Also, based on the importance, the video stream is partitioned.

In a fourth embodiment of the present invention, a system is provided. A motion-vector extractor extracts one or more motion vectors from a video stream. An analysis software tool assigns an importance to each of the motion vectors. The analysis software tool also controls an error-protection controller to add error protection based on the assigned importance and controls a video stream partitioner for partitioning the video stream based on the assigned importance. The video stream partitioner partitions the video stream. The error-protection controller adds error protection to the video stream. A transmitter sends the video stream to a device.

DETAILED DESCRIPTION OF THE PREFERRED EMBODIMENTS

In an embodiment according to the present invention, video is encoded or arrives over a network in an encoded format. Motion vectors, which are present in the encoded video, are removed. The motion vectors are analyzed. Based on the analysis, error protection is added to the video stream and the video stream is partitioned.

Figure 1:
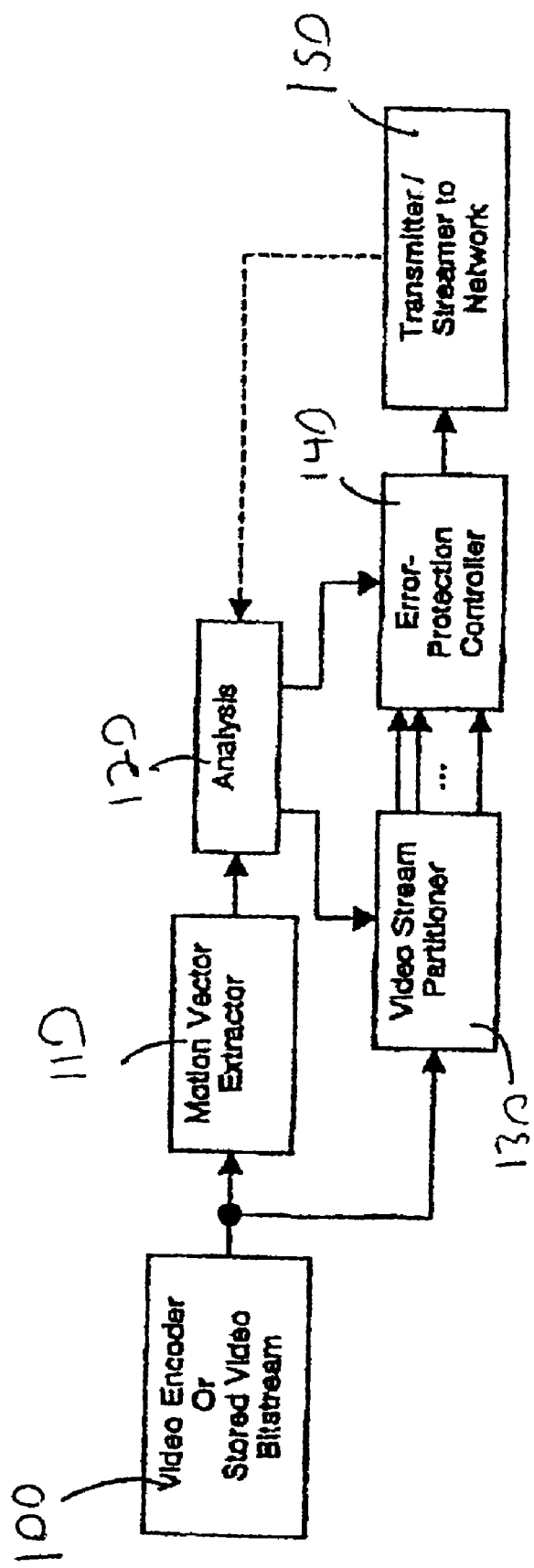
FIG. 1 shows a block diagram of an embodiment of the present invention.

FIG. 1 shows a block diagram of a system 1 according to an embodiment of the present invention. Video is encoded by a video encoder 100 (e.g., live video) or arrives as a stored video bitstream (e.g., pre-compressed video). In certain embodiments, the stored video may arrive from a server in a client-server network or from a peer in a peer-to-peer network.

The encoded video or the stored video stream passes through a motion-vector extractor 110 where the motion vectors (MVs) are extracted from the video stream.

Figure 3:
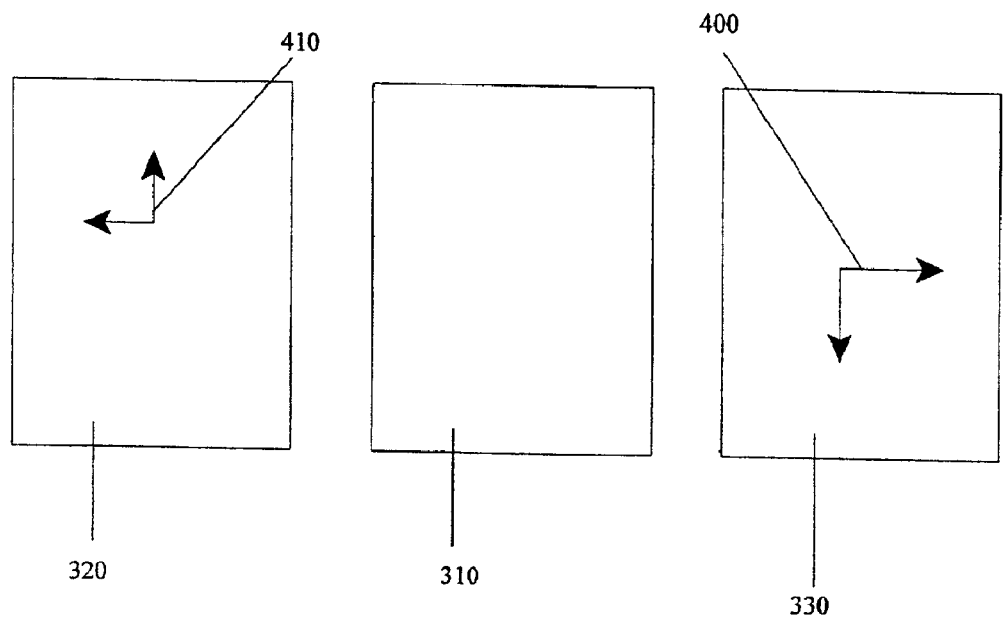
FIG. 3 shows a first and second motion vector present in the P and B frames.

Preferably, the motion-vector extractor acts as a bitstream parser. Motion vectors are used in MPEG (e.g., MPEG-2 and MPEG-4) to show the motion of an object that is present in an I-frame as it propagates in time to either a P frame or a B frame. Motion vectors as they relate to an object in an I, P, and B frame are shown in FIG. 3.

The motion vectors are then analyzed in an analysis software tool 120. Preferably, certain frames or portions of certain frames that comprise the video stream are labeled "important." For example, predictions about which portions of certain frames (e.g., motion vectors) are most likely to be lost are made. Such portions can then be labeled "important".

The encoded video is partitioned by a video stream partitioner 130. For example, the video stream can be partitioned into texture data, scene data, and/or motion data. The results obtained from the analysis software tool 120 can be used to control the type of partitioning that is done to the video stream. For example, the analysis software tool 120 could detect the moving of objects in a particular section(s) (e.g., the top) of a frame. Future frames could then be partitioned so that the same particular section(s) in the future frames receive more error protection than other section(s) (e.g., the bottom of the frame).

Error protection is added to the video stream based on the results obtained by the analysis software tool 120 by an error-protection controller 140. In essence, error protection is applied to the whole video sequence dependent on the data inside the sequence. Thus, bandwidth is not wasted by applying error protection on portions or types of video that are not important. Moreover, bandwidth is not wasted on portions or types of video that could be concealed at the receiver without error protection. For example, when the video stream is broken into packets, UEP (unequal error protection) can be applied to the data based upon the analysis. Preferably, more error protection is added to the portions of the video stream labeled "important." For example, packets or MPEG video headers in "important" regions could get more protection in the form of better error-correcting codes (e.g., Reed-Solomon codes), or portions of that data could be repeated elsewhere in the video stream (redundancy). In another embodiment of the present invention, the analysis software tool 120 could detect a contiguous region or "blob" moving linearly across a sequence of frames. The system 1 could then reduce the level of error protection or priority given to some of the packets used in transmitting the sequence of frames, since a receiver (not shown) is capable of concealing errors in linear-motion regions that arise due to missing frames.

The analysis software tool 120 can also compute specific data elements as they relate to the motion vectors. For example, a total energy (or variance) data element, a mean or variance data element, a global direction measure element, a contiguous direction data element (e.g., representation of a similar portion of the frame), or a random noise data element can be computed. The total energy data element can be used to show the net total of the data elements present in the entire frame field. The mean or variance data element can be used to measure the total or directional motion of a particular object. The global direction measure data element can be used to indicate a panning of the camera. The contiguous direction data element can be used when the whole frame has a plurality of data elements moving in the same direction. The random noise data element can be used to indicate the presence of "unimportant" noise. The error protection or the partitioning of the video stream can then be based on the data elements that are obtained.

A transmitter 150 sends the video stream through a physical or wireless medium to one or more devices (e.g., receivers). Preferably, the devices are located on a network. In an embodiment of the present invention where a feedback-type protector is used, the motion vector analysis can be used to handle the feedback from the network. In such an embodiment, the transmitter 150 can send the video stream back to the analyzer software tool 120. Feedback can also be used to affect the type of error protection given. For example, if the receiver (not shown) feeds back data indicating that motion is not being reproduced correctly (e.g, due to errors) to the analysis software tool 120, the system 1 can increase or change the level of protection given to the video stream based upon both the feedback from the receiver and the type of motion vectors in the stream. The system 1 can also be programmed to ignore certain types of feedback. For example, if the receiver (not shown) detects that a packet is missing and sends a request for retransmission to the system 1 of FIG. 1, the system 1 can be programed to ignore the request.

The request can be ignored because the receiver will do an acceptable job at concealing the error.

Thus, the system 1 does not retransmit the packet.

Figure 2:
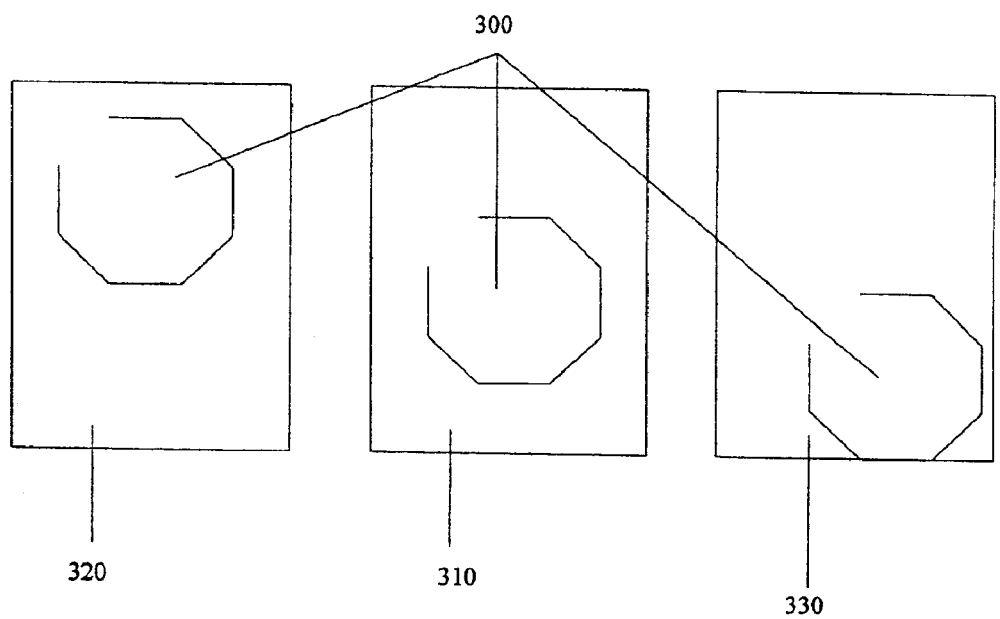
FIG. 2 shows an I frame, P frame, and B frame of MPEG video each of which contain an object.

FIG. 2 shows an I frame 310, P frame 330, and B frame 320 of MPEG video each of which contain an object 300. As can be seen, the object 300 is moving to the right and downwards throughout the frames.

FIG. 3 shows a first and second motion vector 400,410 present in the P and B frames 330,320. The first motion vector 400 has a positive horizontal magnitude and a negative vertical magnitude. The first motion vector 400 is used to predict the motion of the object 300 from the I frame 310 to the P frame 330. The second motion vector 410 has a negative horizontal magnitude and a positive vertical magnitude. The second motion vector 410 is used to predict the motion of the object 300 from the I frame 310 to the B frame 320. The I frame 310 does not contain a motion vector because the object 300 had been coded into the I frame 310.

Certain regions which have "similar" motion vectors, for example, an object or point of interest, can be identified in the frame by identifying motion vectors that are similar. For example, a frame may contain a set of motion vectors that all point 45 degrees up with the same magnitude, which are representative of an object moving in that direction. Error protection can then be implemented by adding error detection or correction codes to the data (e.g., the motion vectors, headers, and texture data) based on the set of motion vectors.

In the preceding specification, the invention has been described with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for data transmission, comprising the acts of:
   receiving a multimedia stream through an electronic medium, the stream comprising a plurality of motion vectors;
   extracting one or more vectors from the multimedia stream;
   analyzing the one or ore extracted motion vectors;
   partitioning the multimedia stream into a plurality of data types based at least in part on the analysis of the extracted motion vectors; and
   adding a plurality of error protection units to the multimedia stream based on the analysis of the extracted motion vectors.

2. A method for data transmission, comprising the steps of:
   receiving a video stream through an electronic medium, the stream comprising a plurality of motion vectors;
   extracting one or more vectors from the video stream;
   assigning an importance to the motion vectors;
   based on the importance, partitioning the video stream into a plurality of data types; and
   based on the importance, adding a plurality of error protection units to the partitioned video stream.

3. A method for data transmission, comprising the steps of:
   generating a video transmission;
   converting the video transmission to a video stream, the video stream comprising a plurality of vectors;
   extracting one or more vectors from the video stream;
   assigning an importance to the extracted motion vectors;
   based on the assigned importance, partitioning the video stream into a plurality of data types; and
   based on the assigned importance, adding a plurality of error protection units to the video stream.

4. The method as recited in claim 1 further comprising the step of assigning an importance to each vector; and wherein the step of adding further comprises adding the error protection units based on the importance.

5. The method as recited in claim 1 further comprising the step of sending the multimedia stream with the error protection units over an electronic medium.

6. The method as recited in claim 1 wherein the multimedia stream is a video stream.

7. The method as recited in claim 1 wherein the multimedia stream is in the MPEG format.

8. The method as recited in claim 1 wherein the vectors are used to form one or more data elements from the group consisting of: a total energy (or variance) data element, a mean or variance data element, a global direction measure data element, and a plurality of small random motion data elements; and wherein the error protection units are added to the multimedia stream based on the data elements.

9. The method as recited in claim 1 further comprising the steps of selecting a plurality similar vectors from the vectors based on a direction and adding the error protection units based on the similar vectors.

10. The method as recited in claim 2 further comprising the step of sending the video stream with the error protection units over an electronic medium.

11. The method as recited in claim 2 wherein the video stream is in the MPEG format.

12. The method as recited in claim 2 wherein the vectors are used to form one or more data elements from the group consisting of: a total energy (or variance) data element, a mean or variance data element, a global direction measure data element, and a plurality of small random motion data elements; and wherein error protection units are added to the video stream based on the data elements; and wherein the video stream is partitioned based on the data elements.

13. The method as recited in claim 2 further comprising the steps of selecting a plurality of similar vectors from the vectors based on a direction and adding the error protection units based on the similar vectors.

14. The method as recited in claim 3 further comprising the step of sending the video stream with the error protection units over an electronic medium.

15. The method as recited in claim 3 wherein the video stream is in the MPEG format.

16. The method as recited in claim 3 wherein the vectors are used to form one or more data elements from the group consisting of: a total energy (or variance) data element, a mean or variance data element, a global direction measure data element, and a plurality of small random motion data elements; and wherein error protection units are added to the video stream based on the data elements; and wherein the video stream is partitioned based on the data elements.

17. The method as recited in claim 3 further comprising the steps of a plurality of similar vectors from the vectors based on a direction and adding the error protection units based on the similar vectors.

18. The method as recited in claim 1 further comprising the step of adding UEP to the multimedia stream based on the vectors.

19. The method as recited in claim 2 further comprising the step of adding UEP to the video stream based on the vectors.

20. The method as recited in claim 3 further comprising the step of adding UEP to the video stream based on the vectors.

21. A system comprising:
   a motion-vector extractor for one or more motion vectors from a video stream;
   a video stream partitioner for partitioning the video stream based on an assigned importance to the extracted one or more motion vectors;
   an error-protection controller for adding error protection to the video stream based on an assigned importance to the extracted one or more motion vectors;
   an analysis software tool for assigning the importance to each of the motion vectors, controlling the error-protection controller to add error protection based on the assigned importance, and controlling the video stream partitioner for partitioning the video stream based on the a signed importance; and
   a transmitter for sending the video stream to a device.

22. A computer-readable medium, having stored thereon, computer executable process steps operative to control computer to document source files, the steps comprising:
   receiving a multimedia stream through an electronic medium, the stream comprising a plurality of motion vectors;
   extracting one or more vectors from the multimedia stream;
   analyzing the one or more extracted motion vectors;
   partitioning the multimedia stream into a plurality of data types based at least in part on the analysis of the extracted motion vectors; and
   adding a plurality of error protection units to the multimedia stream based on the analysis of the extracted motion vectors.

23. A computer-readable medium, having stored thereon, computer executable process steps operative to control computer to document source files, the steps comprising:
   receiving a video stream through an electronic medium, the stream comprising a plurality of vectors;
   assigning an importance to the motion vectors;
   extracting one or more vectors from the video stream;
   based on the importance, partitioning the video stream into a plurality of data types; and
   based on the importance, adding a plurality of error protection units to the partitioned video stream.

24. A computer-readable medium, having stored thereon, computer executable process steps operative to control computer to document source files, the steps comprising:
   generating a video transmission;
   converting the video transmission to video stream, the video stream comprising a plurality of motion vectors;
   extracting one or more vectors from the video stream;
   based on the importance, partitioning the video stream; and
   based on the importance, adding a plurality of error protection units to the video stream.

25. The method as recited in claim 1, wherein the plurality of data types in which the multimedia stream is partitioned into comprise texture data, scene data and motion data.

26. The method as recited in claim 2, wherein the plurality of data types in which the video stream is partitioned into comprise texture data, scene data and motion data.

27. The method as recited in claim 3, wherein the plurality of data types in which the video stream is partitioned into comprise texture data, scene data and motion data.

* * * * *